(12) United States Patent
Furuya et al.

(10) Patent No.: US 10,380,276 B2
(45) Date of Patent: Aug. 13, 2019

(54) INFORMATION PROCESSING APPARATUS THAT ADJUSTS ANALYSIS MODEL AND METHOD FOR ADJUSTING ANALYSIS MODEL

(71) Applicant: FUJITSU LIMITED, Kawasaki-shi, Kanagawa (JP)

(72) Inventors: Hiroyuki Furuya, Kawasaki (JP); Akihiro Otsuka, Yokohama (JP); Akira Ueda, Yokohama (JP); Atsushi Yamaguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 439 days.

(21) Appl. No.: 15/001,497

(22) Filed: Jan. 20, 2016

(65) Prior Publication Data

US 2016/0232261 A1   Aug. 11, 2016

(30) Foreign Application Priority Data

Feb. 6, 2015   (JP) .................................. 2015-022577

(51) Int. Cl.
*F02C 7/04*   (2006.01)
*G06F 17/50*   (2006.01)

(52) U.S. Cl.
CPC ...... *G06F 17/5009* (2013.01); *G06F 2217/80* (2013.01)

(58) Field of Classification Search
CPC ............................. G06F 17/5009; G06F 17/10
See application file for complete search history.

(56) References Cited

U.S. PATENT DOCUMENTS

2002/0183993 A1   12/2002   Hirata
2003/0046943 A1*   3/2003   Takano ................ B60H 1/3207
                                                                62/186

(Continued)

FOREIGN PATENT DOCUMENTS

JP            11-337402       12/1999
JP            2001-108642       4/2001

(Continued)

OTHER PUBLICATIONS

Uraki Yasushi et al. "Method and Device for Creating Analytic Model, as Well as Cooling Effect Simulation Apparatus" Translation JP 2004164269 A.*

(Continued)

*Primary Examiner* — Timothy A Mudrick
*Assistant Examiner* — Abdou K Seye
(74) *Attorney, Agent, or Firm* — Fujitsu Patent Center

(57) ABSTRACT

A non-transitory computer-readable recording medium stores an analysis model adjustment program. The analysis model adjustment program makes a computer execute the following processes. The computer compares a first attribute value that indicates an operating point of a fan in a first analysis model that represents an apparatus that includes the fan with a second attribute value that indicates an operating point of the fan in a second analysis model that is more simplified than the first analysis model. Next, the computer changes an aperture ratio of the second analysis model according to a result of the comparing the first attribute value with the second attribute value.

11 Claims, 22 Drawing Sheets

(56) References Cited

U.S. PATENT DOCUMENTS

| | | | | |
|---|---|---|---|---|
| 2004/0016829 | A1* | 1/2004 | Crawford | A62C 5/02 239/418 |
| 2006/0225481 | A1* | 10/2006 | Kato | F04D 27/00 73/1.01 |
| 2009/0193051 | A1* | 7/2009 | Ueda | G06F 17/5009 |
| 2011/0060571 | A1* | 3/2011 | Ueda | G06F 17/5004 703/9 |
| 2011/0137621 | A1* | 6/2011 | Holahan | F04D 25/16 703/2 |
| 2012/0239355 | A1 | 9/2012 | Kobayashi et al. | |
| 2012/0310605 | A1 | 12/2012 | Abe et al. | |
| 2013/0131886 | A1* | 5/2013 | Nitta | H05K 7/20209 700/300 |
| 2013/0144569 | A1 | 6/2013 | Abe et al. | |
| 2014/0288889 | A1 | 9/2014 | Furuya et al. | |
| 2015/0192139 | A1* | 7/2015 | Yamaguchi | F04D 27/00 700/275 |

FOREIGN PATENT DOCUMENTS

| | | |
|---|---|---|
| JP | 2002-358335 | 12/2002 |
| JP | 2004164269 A * | 6/2004 |
| JP | 2011-159674 | 8/2011 |
| JP | 2012-198610 | 10/2012 |
| JP | 2012-252522 | 12/2012 |
| JP | 2013-120456 | 6/2013 |
| JP | 2014-186519 | 10/2014 |

OTHER PUBLICATIONS

Yuusuke Suzuki et al., "The Simple Software Development for SEA Analysis by Using Matlab", The 43rd Academic Lectures of the College of Industrial Technology, Nihon University, pp. 47-50, Dec. 4, 2010 (15 pages).

Ayumi Takahashi et al., "Comparison between Hybrid Sea Model and Conventional SEA Model for Vehicle Audio Analysis—II. Comparison with Hybrid SEA Model-", The 43rd Academic Lectures of the College of Industrial Technology, Nihon University, pp. 55-58, Dec. 4, 2010 (17 pages).

* cited by examiner

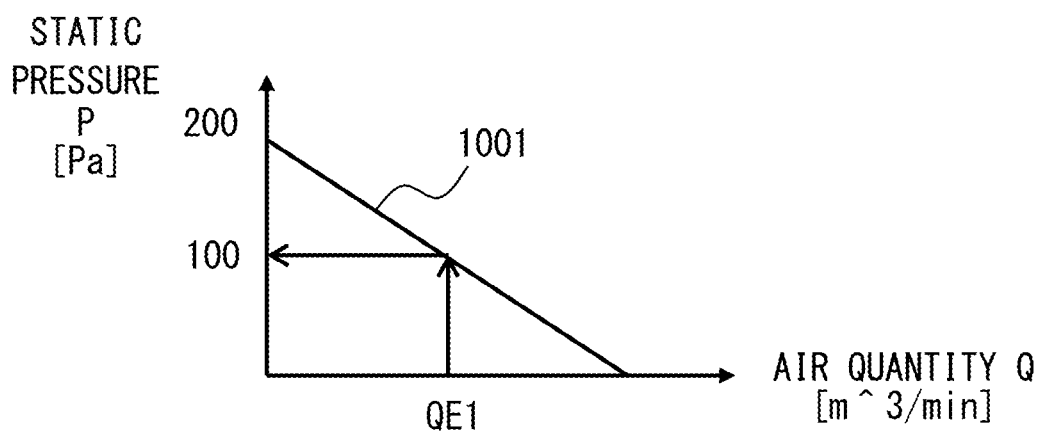
F I G. 1 0

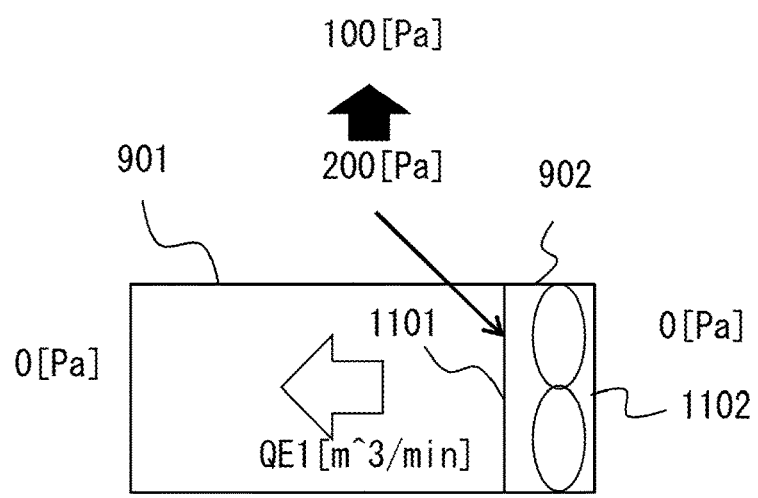
F I G. 1 1

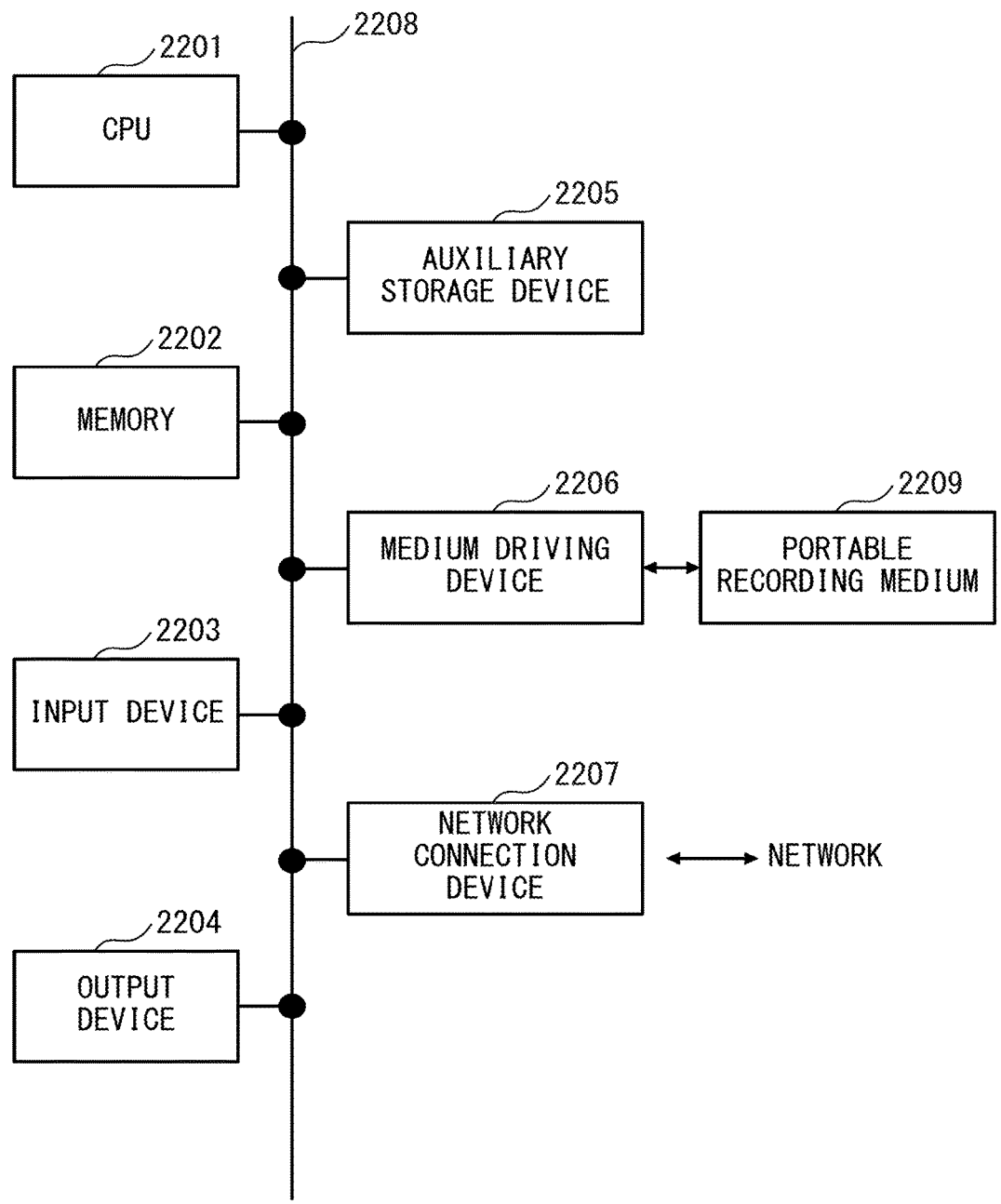
F I G. 2 2

INFORMATION PROCESSING APPARATUS THAT ADJUSTS ANALYSIS MODEL AND METHOD FOR ADJUSTING ANALYSIS MODEL

CROSS-REFERENCE TO RELATED APPLICATION

This application is based upon and claims the benefit of priority of the prior Japanese Patent Application No. 2015-022577, filed on Feb. 6, 2015, the entire contents of which are incorporated herein by reference.

FIELD

The embodiments discussed herein are related to an information processing apparatus and a method for adjusting an analysis model.

BACKGROUND

In recent years, a fluid analysis model has been generated according to an apparatus model of three-dimensional computer aided design (CAD), in order to conduct a thermal fluid analysis of an electronic/electric apparatus or the like. In thermal fluid analysis using the fluid analysis model, ventilation resistance, air quantity and the like may be predicted from the shape of the apparatus and the performance of the fan according to the fluid analysis. In addition, the temperature of each section of the apparatus may be predicted by thermal analysis by providing the heat-generating conditions for heat-generating elements.

Fluid analysis models are roughly divided into a detailed model in which only a part of the apparatus model is simplified, and a simplified model in which the entire apparatus model is significantly simplified. The simplified model is a fluid analysis model that is more simplified than the detailed model.

The detailed model is generated by changing the corner sections of the apparatus model from curves into square corners, and removing screws and dowels from the apparatus model. The analysis time may be reduced by conducting the fluid analysis using the detailed model, compared with the case in which the apparatus model is used without any change.

The simplified model is generated by replacing each component model included in the apparatus model with a significantly simplified shape such as a cuboid or the like. The analysis time maybe further reduced by conducting the fluid analysis using the simplified model, compared with the case in which the detailed model is used.

When there is an aperture on a surface of a plate-shaped component, the user sets the aperture ratio or the aperture area for the plate-shaped component model included in the simplified model. The aperture ratio of a component model represents the ratio of the area of the aperture of the component model to the surface area of the component model.

The target value of the aperture ratio of each component included in the apparatus is determined in the design stage, and therefore, the designer knows the aperture ratio and is able to set the same aperture ratio for the component model included in the simplified model. Meanwhile, when a person other than the designer conducts a fluid analysis, the aperture ratio for a component model is obtained by calculating the aperture area according to the shape and the number of apertures in the apparatus model or by calculating the aperture area from the shape of the gap between component models.

Recently, environments for conducting the thermal fluid analysis using the detailed model are being established with improvements in the performance of computers and in the performance of the fluid analysis software. However, the detailed model consumes more calculation resources than the simplified model, and therefore, the simplified model is used when the thermal fluid analysis is to be performed in a large number of patterns, when the thermal fluid analysis is to be performed in a short period of time, and when the available calculation resources are limited.

Meanwhile, in an acoustic analysis according to the Statistical Energy Analysis (SEA) method, an SEA model is generated as an acoustic analysis model. The acoustic power transmitted from the sound source such as a fan or the like inside an apparatus to the outside of the apparatus may be predicted by calculating the loss within the SEA elements (internal loss) included in the SEA model and the loss between the SEA elements (coupling loss) according to the acoustic power of the sound source.

The SEA method is an acoustic analysis method based on the existence of at least one mode in the sound field element that is the model of the portion of the space inside the apparatus. The SEA method is suitable for the prediction of high-frequency sounds because, assuming the same cubic volume, the higher the frequency, the more modes exist, and the greater the cubic volume, the more modes exist. Instead of the detailed model, the simplified model is used as the SEA model, because a sound field element that has a large cubic volume to some extent is desirable for the SEA method.

The Finite Element Method (FEM) is known as an acoustic analysis method other than the SEA method. In the FEM, the acoustic analysis may be conducted without changing the detailed model, but the number of modes for high frequency increases, and the mesh becomes finer. For this reason, the FEM is often used for the acoustic analysis for low frequency.

A statistical energy analysis method in which optimal division of subsystems is performed is also known (for example, see Patent document 1). In this statistical energy analysis method, vibration is sequentially applied at a plurality of points in each of arbitrarily divided subsystems, and the vibration speed of the structural object at the time of each application of vibration is sequentially measured at a plurality of points. Then, an addition average value of the respective square vibration speeds is obtained from the respective vibration speeds measured in the respective subsystems, and whether adjacent subsystems are different subsystems or the same subsystems are determined according to whether or not the difference between the addition average values between the adjacent subsystems exceeds a threshold.

An analysis support program that makes it possible to make the work for generating the analysis model efficient is also known (for example, see Patent document 2). According to this analysis support program, a three-dimensional figure that surrounds a target object and a three-dimensional figure that surrounds each component in the group of components included in the target object are generated, according to design information with respect to the target object. Then, among a plurality of elements divided in the three-dimensional figure that surrounds the target object, an element that belongs to the three-dimensional figure that surrounds each component is determined, and a space model that represents the space in which each component exists is generated according to the element that belongs to the three-dimensional figure that surrounds each component.

A data processing program in which the projection range including the group of components to be the projection target may be easily set is also known (for example, see Patent document 3). An SEA method using the coupling loss factor (CLF) between sound field elements is also known (for example, see Non-patent document 1 and Non-patent document 2).

Patent document 1: Japanese Laid-open Patent Publication No. 11-337402

Patent document 2: Japanese Laid-open Patent Publication No. 2012-252522

Patent document 3: Japanese Laid-open Patent Publication No. 2013-120456

Non-patent document 1: SUZUKI et al., "The Simple Software Development for SEA Analysis by Using Matlab", The 43rd Academic Lectures of the College of Industrial Technology, Nihon University, p. 47-50, 4 Dec. 2010

Non-patent document 2: TAKAHASHI et al., "Comparison between Hybrid SEA Model and Conventional SEA Model for Vehicle Audio Analysis—II. Comparison with Hybrid SEA Model—", The 43rd Academic Lectures of the College of Industrial Technology, Nihon University, p. 55-58, 4 Dec. 2010

SUMMARY

According to an aspect of the embodiments, a non-transitory computer-readable recording medium stores an analysis model adjustment program. The analysis model adjustment program makes a computer execute the following processes.

(1) The computer compares a first attribute value that indicates an operating point of a fan in a first analysis model that represents an apparatus that includes the fan with a second attribute value that indicates an operating point of the fan in a second analysis model that is more simplified than the first analysis model.

(2) The computer changes an aperture ratio of the second analysis model according to a result of the comparing the first attribute value with the second attribute value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a chart illustrating operating characteristics of a fan with respect to an analysis model;

FIG. 11 is a diagram illustrating an exhaust-side model;

FIG. 22 is a hardware configuration diagram of an information processing apparatus.

DESCRIPTION OF EMBODIMENTS

Hereinafter, embodiments are explained in detail with reference to the drawings.

The conventional thermal fluid analysis or acoustic analysis has problems as described below.

Thermal fluid analysis using the detailed model consumes considerable calculation resources and calculation time. On the other hand, with thermal fluid analysis or acoustic analysis using the simplified model, it is possible to obtain the analysis result with fewer calculation resources and less calculation time.

However, in order to generate the simplified model, empirical knowledge is often used, and it is very difficult for a beginner to generate a highly accurate simplified model. For example, when another component is placed close to an aperture of a plate-shaped component, the aperture area substantially becomes smaller than in the case in which there is nothing placed near the aperture, and therefore, the air quantity that passes through the aperture and the acoustic power emitted from the aperture also become smaller. In this case, it is desirable to set a smaller value than the design value as the aperture ratio of the plate-shaped component model included in the simplified model in order to reduce the prediction error in the analysis result.

In addition, it is difficult to tell whether or not the simplified model is highly accurate, until the performance of the manufactured apparatus is measured and the actually measured value and the predicted value according to the simplified model are compared.

Meanwhile, such problems emerge not only in the case in which a thermal fluid analysis or an acoustic analysis of an apparatus is performed using a fluid analysis model or an acoustic analysis model but also when other analysis processes are performed using an analysis model that represents an apparatus.

Figure 1:
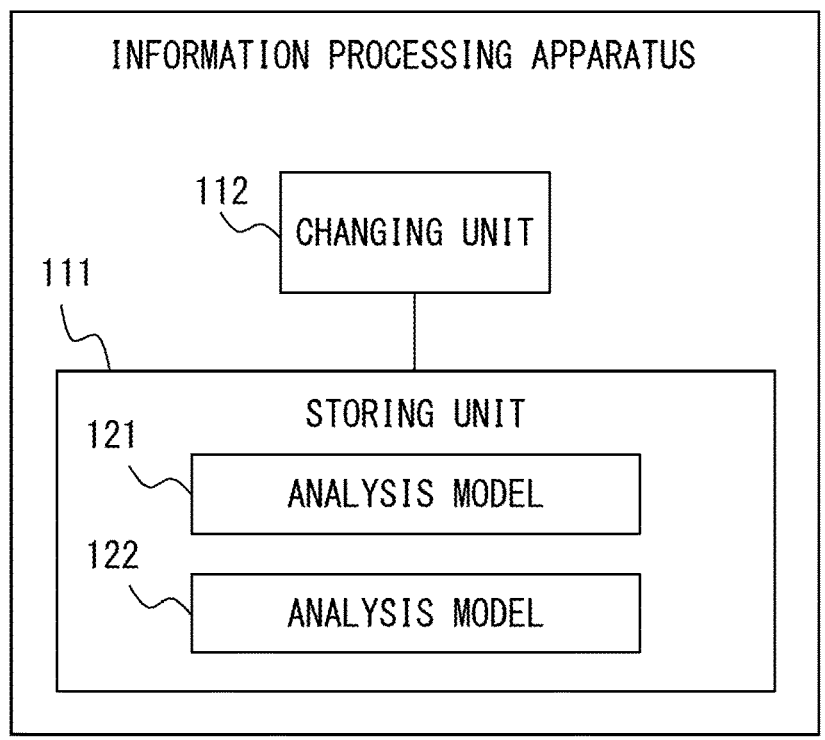
FIG. 1 is a functional configuration diagram of an information processing apparatus.

FIG. 1 illustrates a functional configuration example of an information processing apparatus (computer) according to an embodiment. An information processing apparatus 101 includes a storing unit 111 and a changing unit 112. The storing unit 111 stores an analysis model 121 that represents the apparatus including a fan, and an analysis model 122 that is more simplified than the analysis model 121. The changing unit 112 refers to the analysis model 121 and the analysis model 122 stored in the storing unit 111 and executes an analysis model adjusting process.

Figure 2:
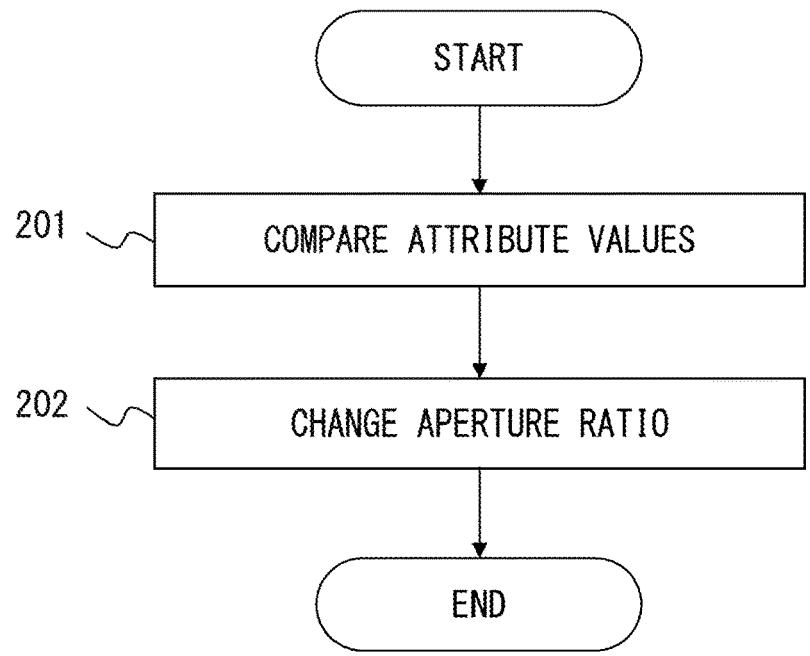
FIG. 2 is a flowchart of an analysis model adjusting process.

FIG. 2 is a flowchart illustrating an example of the analysis model adjusting process executed by the information processing apparatus 101 in FIG. 1. First, the changing unit 112 compares the first attribute value that indicates the operating point of the fan in the analysis model 121 with the second attribute value that indicates the operating point of the fan in the analysis model 122 (step 201). Next, the changing unit 112 changes the aperture ratio of the analysis model 122 according to the result of the comparison of the first attribute value with the second attribute value (step 202).

According to the information processing apparatus 101 in FIG. 1, the accuracy of the analysis process using a simplified analysis model of an apparatus that has an aperture may be improved.

Figure 3:
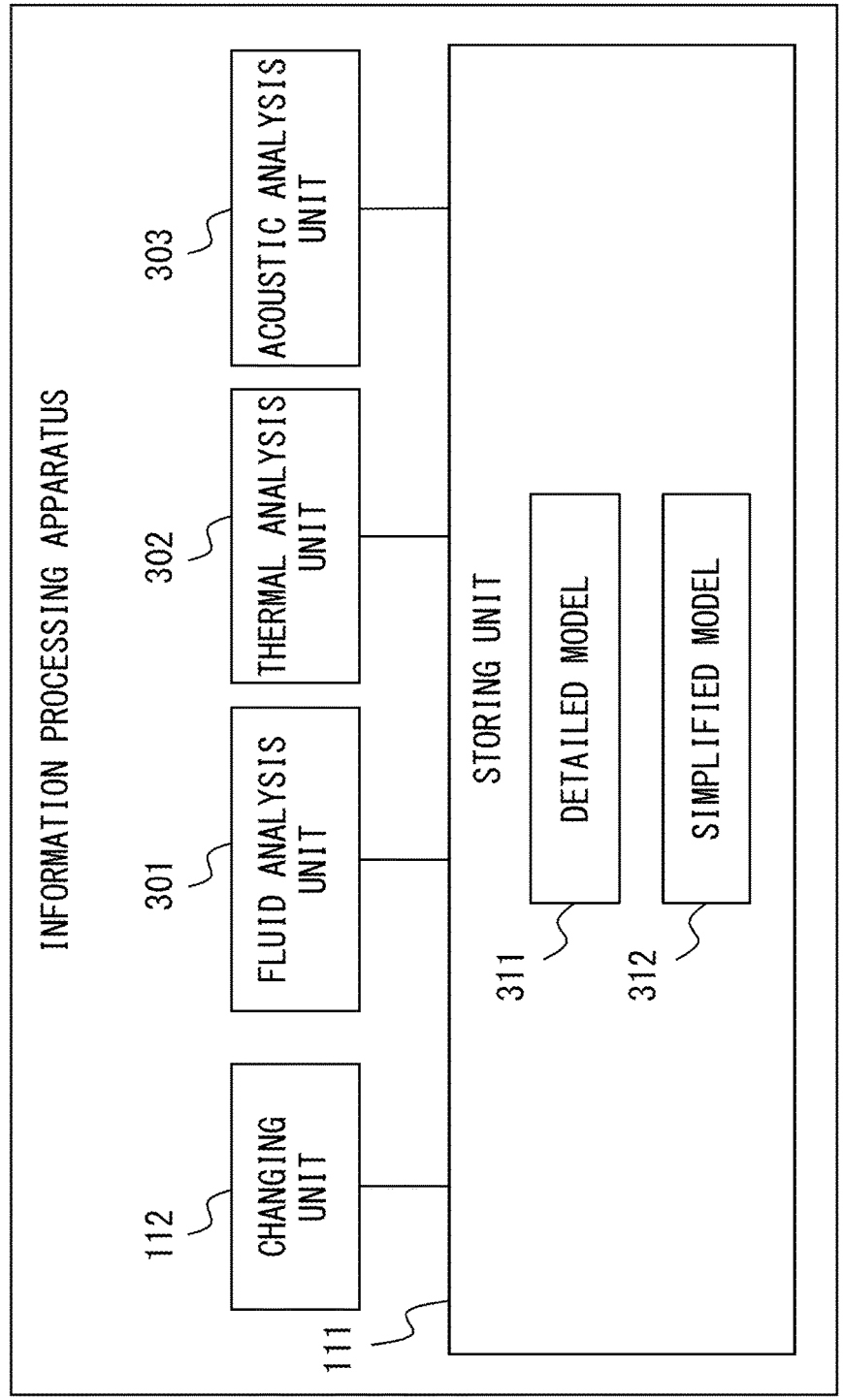
FIG. 3 is a functional configuration diagram illustrating a specific example of an information processing apparatus.

FIG. 3 illustrates a specific example of the information processing apparatus 101 in FIG. 1. The information processing apparatus 101 in FIG. 3 includes the storing unit 111, the changing unit 112, a fluid analysis unit 301, a thermal analysis unit 302, and an acoustic analysis unit 303.

Figure 4B:
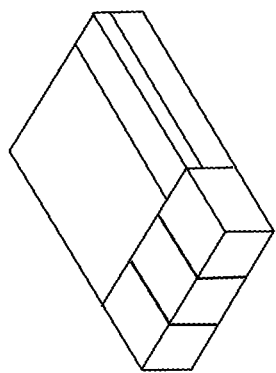
FIG. 4B is an illustration of a simplified model.
Figure 4A:
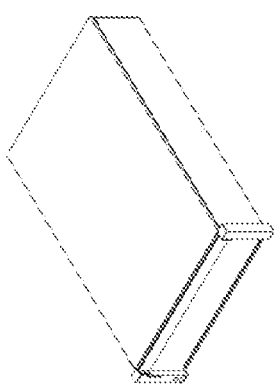
FIG. 4A is an illustration of a detailed model.

The storing unit 111 stores a detailed model 311 corresponding to the analysis model 121 and a simplified model 312 corresponding to the analysis model 122. The detailed model 311 is an analysis model having shapes that are more simplified than those in the apparatus model based on the three-dimensional CAD and includes a plurality of component models that represent a plurality of components. The simplified model 312 is an analysis model having further simplified shapes than those in the detailed model 311 and includes a plurality of component models. FIG. 4A represents an example of the detailed model 311 and FIG. 4B represents an example of the simplified model 312.

The changing unit 112 executes an analysis model adjusting process to adjust the aperture ratio of the simplified model 312 and the fluid analysis unit 301 executes a fluid analysis using the detailed model 311 or the simplified model 312 to predict the ventilation resistance, the air quantity, the static pressure, and the like from the shape of the apparatus and the performance of the fan. The thermal analysis unit 302 executes a thermal analysis using the simplified model 312 to predict the temperature of each section of the apparatus, and the acoustic analysis unit 303 executes an acoustic analysis using the simplified model 312 to predict the acoustic power transmitted from a sound source such as a fan or the like included in the apparatus to the outside of the apparatus.

Figure 5:
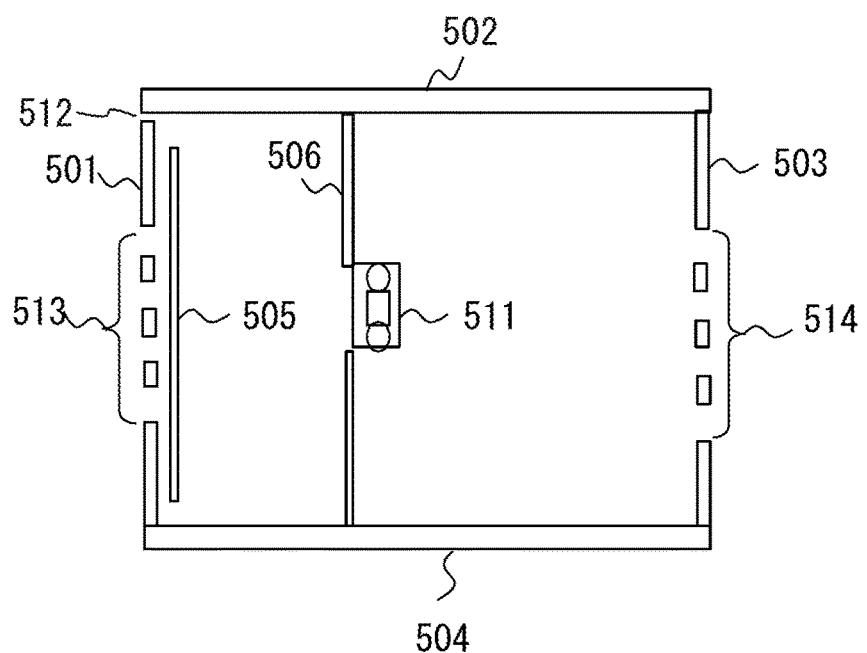
FIG. 5 is a diagram illustrating a detailed model of an apparatus including a fan.

FIG. 5 illustrates an example of the detailed model 311 of an apparatus including a fan. The detailed model in FIG. 5 includes plate-shaped component models 501 through 504 that represent the chassis of the apparatus, plate-shaped component models 505 and 506 that represent a structural object inside the apparatus, and a component model 511 that represents the fan. There is a gap 512 between the component model 501 and the component model 502, the component model 501 has a plurality of apertures 513, and the component model 503 has a plurality of apertures 514.

Figure 6:
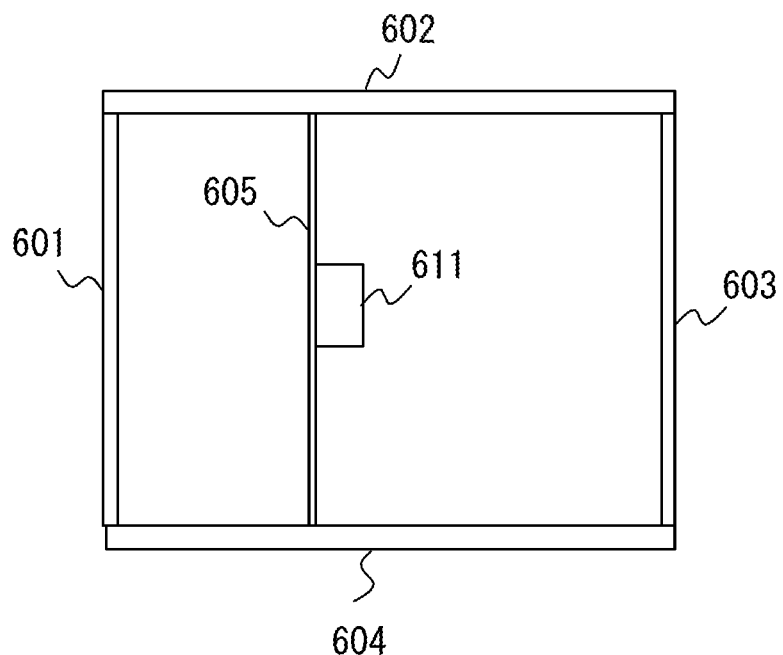
FIG. 6 is a diagram illustrating a simplified model of an apparatus including a fan.

FIG. 6 illustrates an example of the simplified model 312 that corresponds to the detailed model in FIG. 5. The simplified model in FIG. 6 includes plate-shaped component models 601 through 604 that represent the chassis of the apparatus, a plate-shaped component model 605 that represents a structural object inside the apparatus, and a component model 611 that represents the fan. Instead of omitting the apertures in the component models 601 and 603, aperture ratios are set respectively for the component models 601 and 603.

Figure 7:
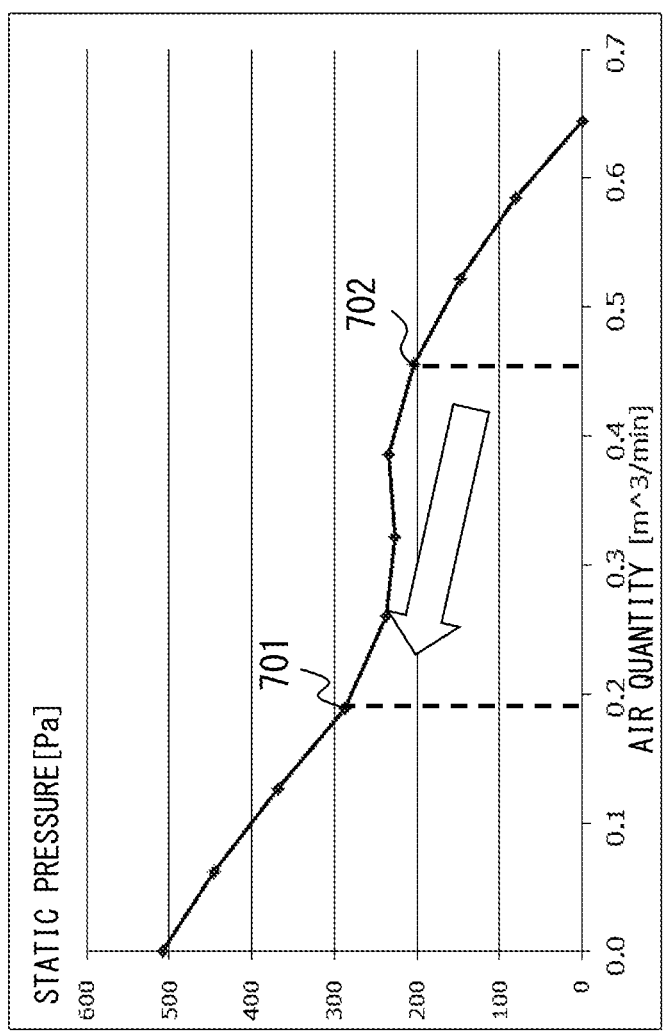
FIG. 7 is a chart illustrating operating characteristics of a fan.

FIG. 7 presents an example of the operating characteristics of the fan. The operating characteristics in FIG. 7 represent the relationship between the air quantity (Q) and the static pressure (P) of the fan and are also called PQ characteristics. The curve that represents the operating characteristics of a fan is determined according to the duty ratio, the rotating speed and the like of the fan, and the air quantity increases as the static pressure decreases.

When an analysis model of an apparatus including a fan is given, the air quantity and the static pressure that indicate a point on the curve of the operating characteristics may be obtained by executing a fluid analysis using this analysis model. Thus, the point on the curve determined according to the analysis model is called the operating point of the fan, and the air quantity and the static pressure at the operating point are called the operating-point air quantity and the operating-point static pressure. Comparing the detailed model 311 with the simplified model 312, it seems that the operating point based on the detailed model 311 is closer to the operating point in the actual apparatus than the operating point based on the simplified model 312.

In the case of the simplified model 312, the operating point may be moved along the curve by changing the aperture ratio of the component model included in the simplified model 312. Therefore, when an operating point 701 based on the detailed model 311 is found, it becomes possible to generate the simplified model 312 that has an accuracy equivalent to that of the detailed model 311 by changing the aperture ratio of the simplified model 312 so as to make an operating point 702 based on the simplified model 312 closer to the operating point 701.

The operating point 702 may be made close to the operating point 701 by reducing the aperture ratio of the simplified model 312 to reduce the operating-point air quantity (to increase the operating-point static pressure). Meanwhile, the operating point 702 may be moved in the direction opposite to the direction toward the operating point 701 by increasing the aperture ratio of the simplified model 312 to increase the operating-point air quantity (to reduce the operating-point static pressure).

Figure 8:
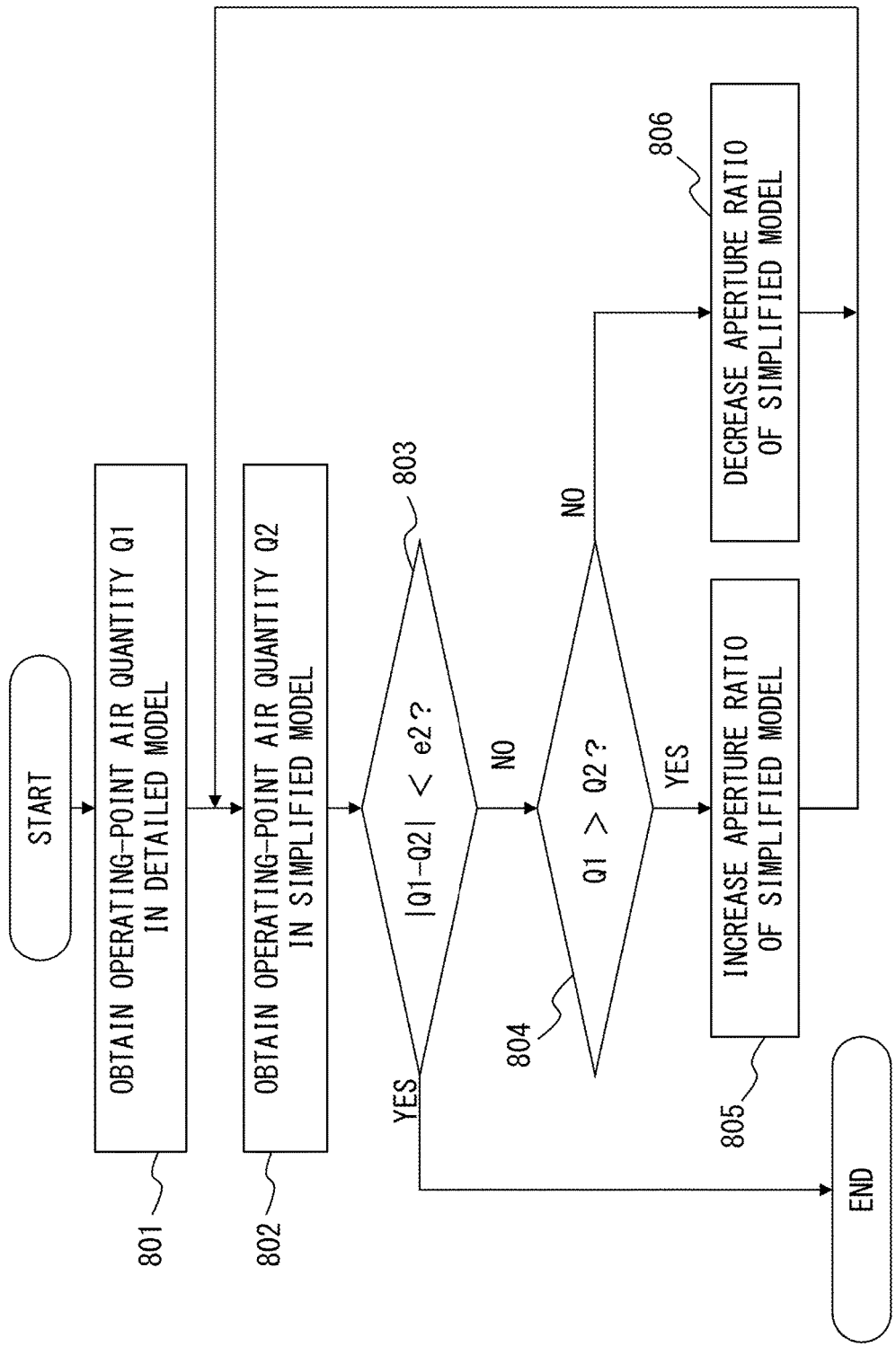
FIG. 8 is a flowchart of an analysis model adjusting process using the air quantity.

FIG. 8 is a flowchart illustrating a specific example of an analysis model adjusting process in a case in which the air quantity is used as an attribute value that indicates the operating point of the fan. First, the changing unit 112 makes a request to the fluid analysis unit 301 for a fluid analysis using the detailed model 311 (step 801). According to the request from the changing unit 112, the fluid analysis unit 301 executes a fluid analysis using the detailed model 311, and stores the analysis result that includes an operating-point air quantity Q1 in the storing unit 111. Then, the changing unit 112 obtains the operating-point air quantity Q1 from the analysis result.

Next, the changing unit 112 makes a request to the fluid analysis unit 301 for a fluid analysis using the simplified model 312 (step 802). According to the request from the changing unit 112, the fluid analysis unit 301 executes a fluid analysis using the simplified model 312, and stores the analysis result that includes an operating-point air quantity Q2 in the storing unit 111. Then, the changing unit 112 obtains the operating-point air quantity Q2 from the analysis result.

Next, the changing unit 112 compares the absolute value of the difference between the operating-point air quantity Q1 and the operating-point air quantity Q2 with a threshold e1

(step 803). A sufficiently small value is used as the threshold e1. When the absolute value of the difference between Q1 and Q2 is equal to or larger than threshold e1 (step 803, NO), the changing unit 112 compares the operating-point air quantity Q1 with the operating-point air quantity Q2 (step 804).

When the operating-point air quantity Q2 is smaller than the operating-point air quantity Q1 (step 804, YES), the changing unit 112 increases the aperture ratio of the simplified model 312 (step 805), and executes the processes in and after step 802. In step 805, the changing unit 112 may increase the aperture ratio by a prescribed value, or may increase it by a prescribed ratio.

Meanwhile, when the operating-point air quantity Q2 is larger than the operating-point air quantity Q1 (step 804, NO), the changing unit 112 decreases the aperture ratio of the simplified model 312 (step 806), and executes the processes in and after step 802. In step 806, the changing unit 112 may decrease the aperture ratio by a prescribed value, or may decrease it by a prescribed ratio.

Then, when the absolute value of the difference between Q1 and Q2 becomes smaller than threshold e1 (step 803, YES), the changing unit 112 terminates the processing.

For example, when it is found that the aperture ratio of the component model 501 is 20% according to the aperture areas of the plurality of apertures 513 in the detailed model in FIG. 5, the aperture ratio of the component model 601 is also set to 20% in the simplified model in FIG. 6. However, the air quantity that passes through the apertures 513 decreases due to the influence of the component model 505 placed close to the plurality of apertures 513, and therefore, it is desirable to set a value smaller than 20% as the aperture ratio of the component model 601 in FIG. 6.

In this case, the changing unit 112 is able to decrease the aperture ratio of the component model 601 gradually by repeating the process in step 806, and to eventually set it to an aperture ratio (for example, 16%) at which the fan operates, with the operating point based on the detailed model in FIG. 5. The difference of 4% between 20% and 16% includes the decrease in the quantity due to the influence of the component model 505 and the increase in the quantity due to the influence of the gap 512. The increase and the decrease make it possible to make the operating-point air quantity Q2 closer to the operating-point air quantity Q1.

According to the analysis model adjusting process in FIG. 8, it becomes possible even for a beginner of the analysis process to easily generate a highly accurate simplified model. By executing fluid analysis, thermal analysis, acoustic analysis and the like using a highly accurate simplified model, an equivalent analysis result may be obtained with fewer calculation resources and less calculation time than those in the case in which the detailed model is used. In addition, it becomes possible to conduct analysis in more patterns in a certain period, compared with the case in which the detailed model is used.

Next, an example of the fluid analysis performed by the fluid analysis unit 301 in step 801 and step 802 in FIG. 8 is explained with reference to FIG. 9 through FIG. 13.

Figure 9:
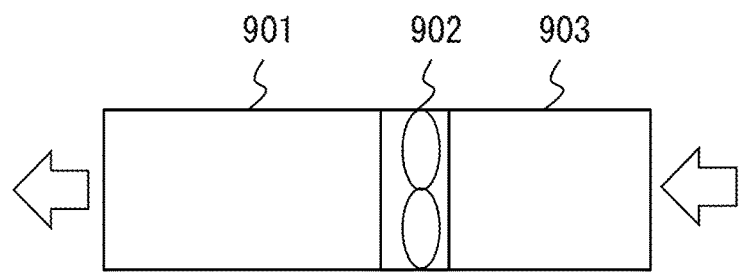
FIG. 9 is a diagram illustrating an analysis model.

FIG. 9 illustrates an example of an analysis model corresponding to the detailed model 311 or the simplified model 312. The analysis model in FIG. 9 includes component models of an exhaust duct 901, a fan 902, and an intake duct 903, and the air flows from the intake duct 903 to the exhaust duct 901. FIG. 10 presents an example of the operating characteristics of the fan 902 with respect to the analysis model in FIG. 9. The fluid analysis unit 301 obtains the operating-point air quantity through the following procedures using the analysis model in FIG. 9 and the operating characteristics in FIG. 10.

(1) The fluid analysis unit 301 reads the maximum static pressure 200 [Pa] from a curve 1001 of the operating characteristics in FIG. 10.

(2) The fluid analysis unit 301 generates an exhaust-side model such as the one in FIG. 11 and sets the static pressure of the exhaust-side boundary surface 1101 of the fan 902 to the maximum static pressure 200 [Pa]. The outside of the exhaust duct 901 is the atmospheric pressure, and therefore, the static pressure of the intake-side boundary surface 1102 between the exit of the exhaust duct 901 and the fan 902 is set to 0 [Pa].

Next, the fluid analysis unit 301 calculates the air quantity QE1 [m^3/min] that flows in the exhaust duct 901, using equations of fluid motion, from the static pressure 0 [Pa] at the exit of the exhaust duct 901 and the shape of the exhaust duct 901. When the analysis model is the simplified model 312, the shape of the exhaust duct 901 includes information of the aperture ratio. The Navier-Stokes equations may be used as the equations of fluid motion, for example.

Then, the fluid analysis unit 301 obtains the static pressure 100 [Pa] of the exhaust-side boundary surface 1101 corresponding to the air quantity QE1, from the obtained air quantity QE1 and the curve 1001 in FIG. 10. Accordingly, the static pressure of the exhaust-side boundary surface 1101 is updated from 200 [Pa] to 100 [Pa]. In addition, the fluid analysis unit 301 obtains the static pressure difference 100 [Pa] from the static pressure 100 [Pa] of the exhaust-side boundary surface 1101 and the static pressure 0 [Pa] of the intake-side boundary surface 1102.

Figure 12:
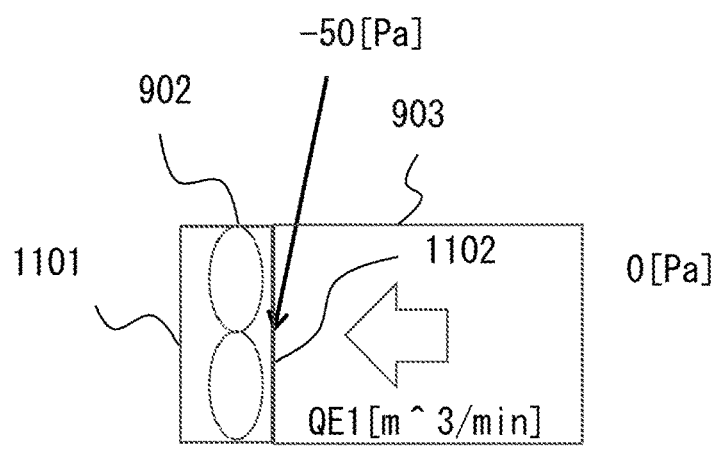
FIG. 12 is a diagram illustrating an intake-side model.

(3) The fluid analysis unit 301 generates an intake-side model such as the one illustrated in FIG. 12, sets the air quantity that flows in the intake duct 903 to QE1, and sets the static pressure at the entrance of the intake duct 903 to 0 [Pa]. Then, the fluid analysis unit 301 calculates the static pressure −50 [Pa] at the intake-side boundary surface 1102, using equations of fluid motion, from the static pressure 0 [Pa] at the entrance of the intake duct 903 and the shape of the intake duct 903. When the analysis model is the simplified model 312, the shape of the intake duct 903 includes information of the aperture ratio.

Figure 13:
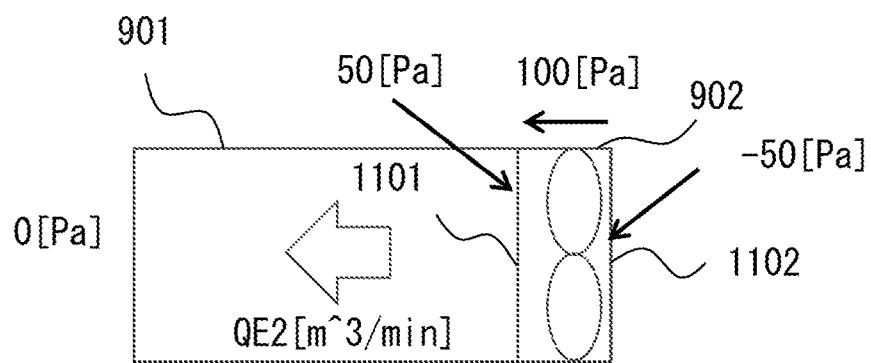
FIG. 13 is a diagram illustrating a static pressure difference.

(4) The fluid analysis unit 301 sets the static pressure of the intake-side boundary surface 1102 to −50 [Pa], and adds the static pressure difference 100 [Pa] obtained in (2) above to the static pressure −50 [Pa], and obtains the static pressure 50 [Pa] of the exhaust-side boundary surface 1101, as illustrated in FIG. 13. Accordingly, the static pressure of the exhaust-side boundary surface 1101 is updated from 100 [Pa] to 50 [Pa].

(5) The fluid analysis unit 301 calculates the air quantity QE2 [m^3/min] that flows in the exhaust duct 901, using equations of fluid motion, from the static pressure 50 [Pa] of the exhaust-side boundary surface 1101, the static pressure 0 [Pa] at the exit of the exhaust duct 901, and the shape of the exhaust duct 901.

(6) The fluid analysis unit 301 compares the absolute value of the difference between the air quantity QE1 and the air quantity QE2 with a prescribed threshold, and repeats the calculations in (2) through (5) described above until the absolute value of the difference between QE1 and QE2 becomes smaller than the prescribed threshold. Then, the air quantity QE2 at the time when the absolute value of the difference between QE1 and QE2 becomes smaller than the prescribed threshold is determined as the operating-point air quantity.

Figure 14:
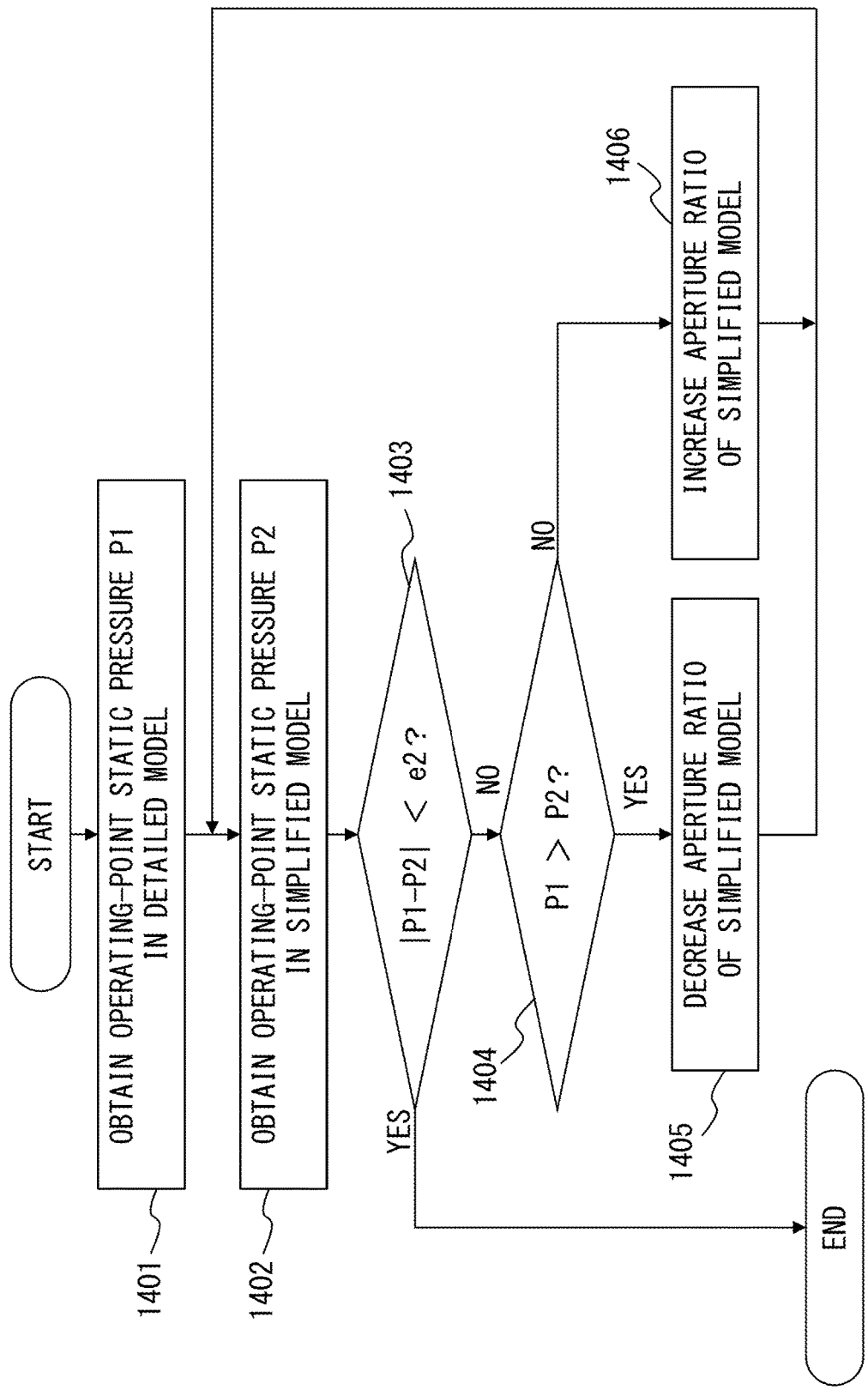
FIG. 14 is a flowchart of an analysis model adjusting process using the static pressure.

FIG. 14 is a flowchart illustrating a specific example of an analysis model adjusting process in which the static pressure is used as an attribute value that indicates the operation point of the fan. First, the changing unit 112 makes a request to the fluid analysis unit 301 for a fluid analysis using the detailed model 311 (step 1401). According to the request from the changing unit 112, the fluid analysis unit 301 executes a fluid analysis using the detailed model 311, and stores the analysis result that includes an operating-point static pressure P1 in the storing unit 111. Then, the changing unit 112 obtains the operating-point static pressure P1 from the analysis result.

Next, the changing unit 112 makes a request to the fluid analysis unit 301 for a fluid analysis using the simplified model 312 (step 1402). According to the request from the changing unit 112, the fluid analysis unit 301 executes a fluid analysis using the simplified model 312, and stores the analysis result that includes an operating-point static pressure P2 in the storing unit 111. Then, the changing unit 112 obtains the operating-point static pressure P2 from the analysis result.

In step 1401 and step 1402, the fluid analysis unit 301 may obtain the operating-point static pressure of the fan 902 through procedures similar to (1) through (6) described above, using the analysis model in FIG. 9 and the operating characteristics in FIG. 10.

Next, the changing unit 112 compares the absolute value of the difference between the operating-point static pressure P1 and the operating-point static pressure P2 with a threshold e2 (step 1403). A sufficiently small value is used as the threshold e2. When the absolute value of the difference between P1 and P2 is equal to or larger than the threshold e2 (step 1403, NO), the changing unit 112 compares the operating-point static pressure P1 with the operating-point static pressure P2 (step 1404).

When the operating-point static pressure P2 is smaller than the operating-point static pressure P1 (step 1404, YES), the changing unit 112 decreases the aperture ratio of the simplified model 312 (step 1405), and executes the processes in and after step 1402. In step 1405, the changing unit 112 may decrease the aperture ratio by a prescribed value, or may decrease it by a prescribed ratio.

Meanwhile, when the operating-point static pressure P2 is larger than the operating-point static pressure P1 (step 1404, NO), the changing unit 112 increases the aperture ratio of the simplified model 312 (step 1406), and executes the processes in and after step 1402. In step 1406, the changing unit 112 may increase the aperture ratio by a prescribed value, or may increase it by a prescribed ratio.

Then, when the absolute value of the difference between P1 and P2 becomes smaller than threshold e2 (step 1403, YES), the changing unit 112 terminates the processing.

According to the analysis model adjusting process in FIG. 14, it becomes possible even for a beginner of the analysis process to easily generate a highly accurate simplified model, in a manner similar to that according to the analysis model adjusting process in FIG. 8.

In the analysis model adjusting processes in FIG. 8 and FIG. 14, when there are a plurality of apertures on the air duct in which the fan is provided, the changing unit 112 may increase/decrease the aperture ratios for these apertures uniformly by the same value or by the same ratio. Meanwhile, the changing unit 112 may compare the difference between the air quantity at each of the apertures included in the detailed model and the air quantity at each of the apertures included in the simplified model, and may change the increase/decrease value for the aperture ratio for each of the apertures according to the difference.

Figure 15:
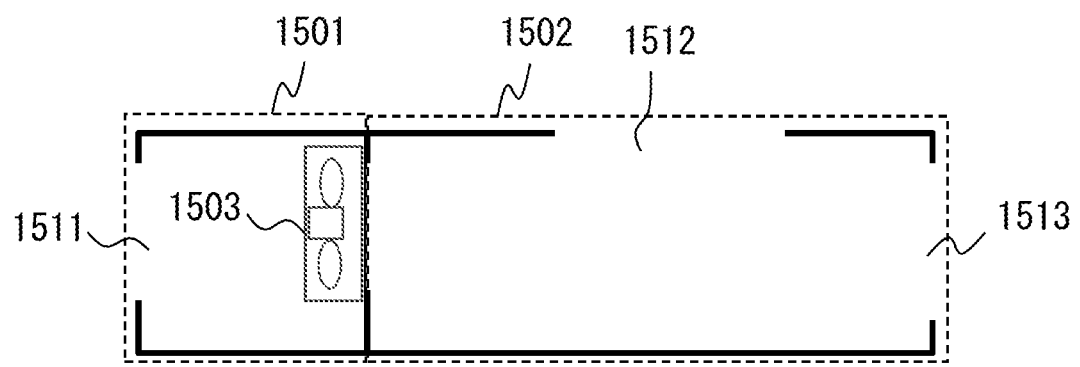
FIG. 15 is a diagram illustrating a simplified model having a plurality of apertures.

FIG. 15 illustrates an example of a simplified model having a plurality of apertures. The simplified model in FIG. includes component models 1501 through 1503, and the component model 1503 represents the fan. The component model 1501 has an intake aperture 1511, and the component model 1502 has exhaust apertures 1512 and 1513.

Figure 16:
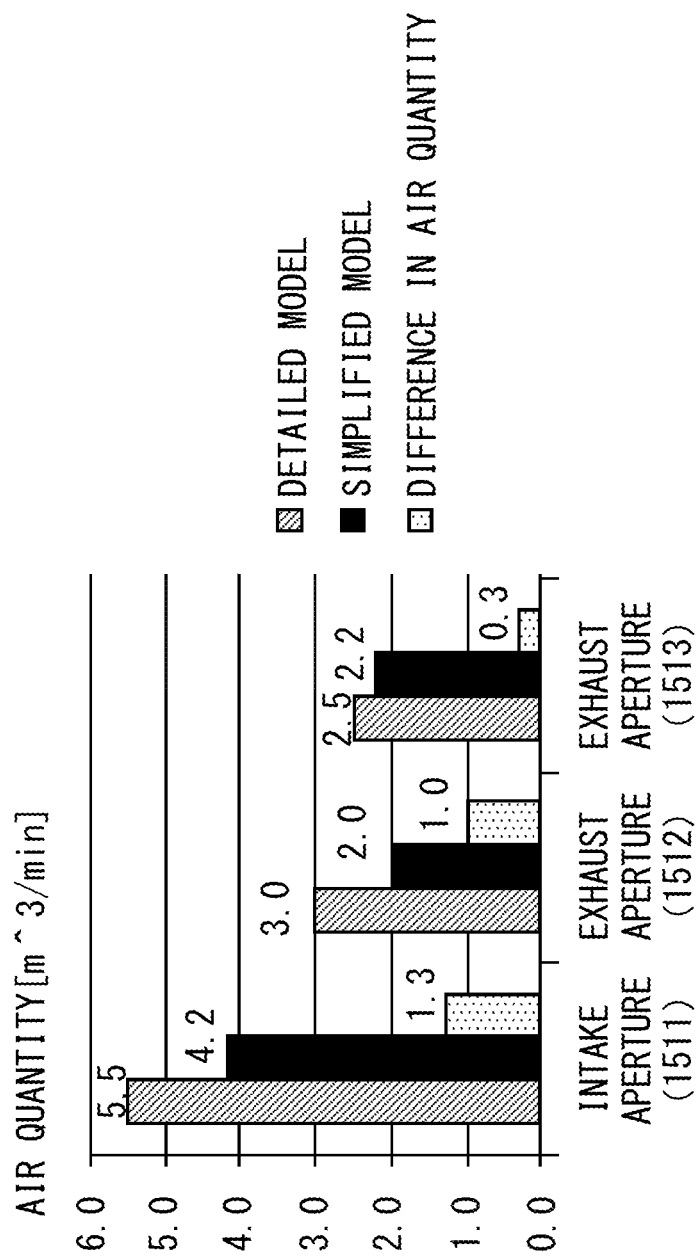
FIG. 16 is a chart illustrating the difference in the air quantity between a detailed model and a simplified model.

FIG. 16 presents the air quantity for each of the apertures obtained by a fluid analysis using the simplified model and the air quantity of each of the apertures obtained by a fluid analysis using the detailed model. The air quantity for the intake aperture 1511 in the detailed model is 5.5 [m^3/min], and the air quantity in the simplified model is 4.2 [m^3/min], and the difference in the air quantity is 1.3 [m^3/min].

Meanwhile, the air quantity for the exhaust aperture 1512 in the detailed model is 3.0 [m^3/min], the air quantity in the simplified model is 2.0 [m^3/min], and the difference in the air quantity is 1.0 [m^3/min]. The air quantity for the exhaust aperture 1513 in the detailed model is 2.5 [m^3/min], the air quantity in the simplified model is 2.2 [m^3/min], and the difference in the air quantity is 0.3 [m^3/min].

In this case, in step 805 in FIG. 8, the changing unit 112 is able to increase the aperture ratio for each of the apertures by a ratio that is proportional to the difference in the air quantity for each of the apertures. Accordingly, the aperture ratios for the intake aperture 1511, the exhaust aperture 1512, and the exhaust aperture 1513 increase by 1.3%, 1%, and 0.3%, respectively, for example.

Thus, by changing the increase/decrease value for the aperture ratio for each of the apertures according to the difference in the air quantity between the detailed model and the simplified model, the aperture ratio for an aperture with a large difference in the air quantity changes to a large extent, and the values of differences in the air quantity for all the apertures become close to each other in the analysis result after the change in the aperture ratios. Accordingly, the number of repetitions for step 802 through step 806 in FIG. 8 is reduced, and the convergence time required until the judgment result in step 803 becomes YES is shortened.

When the analysis model adjusting process in FIG. 14 is used instead of the analysis model adjusting process in FIG. 8, the increase/decrease value for the aperture ratio for each of the apertures may also be changed in a similar manner according to the difference in the air quantity between the detailed model and the simplified model for each of the apertures.

In the case in which a plurality of fans are placed in parallel, the changing unit 112 may execute the analysis model adjusting process using the sum of the operating-point air quantities of these fans as the operating-point air quantity Q1 or the operating-point air quantity Q2 in FIG. 8.

Figure 17:
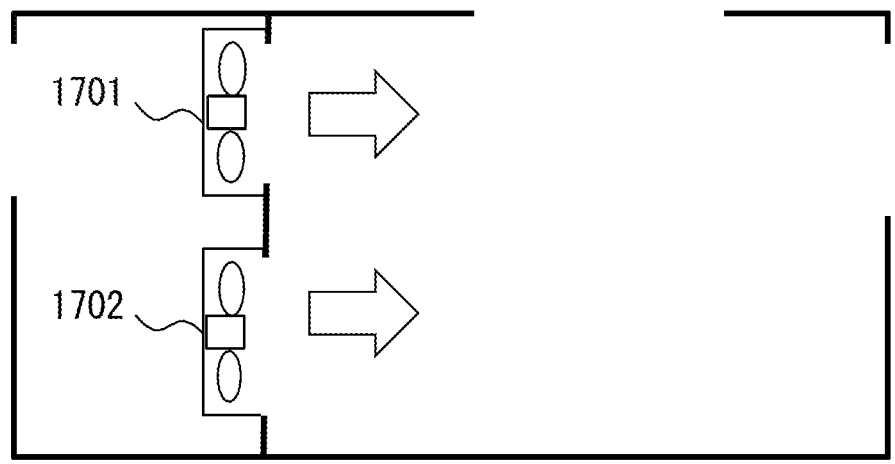
FIG. 17 is a diagram illustrating fans arranged in parallel.

FIG. 17 illustrates an example of a simplified model in which two fans are placed in parallel. When a fan 1701 and a fan 1702 are placed in parallel, the aperture ratio of the simplified model is adjusted so that the sum of the operating-point air quantities of these fans becomes equal for the detailed model and the simplified model. The same applies to the case in which three or more fans are placed in parallel.

Meanwhile, in a case in which a plurality of fans are placed in series, the changing unit 112 is able to execute the analysis model adjusting process using the sum of the operating-point static pressures of these fans as the operating-point static pressure P1 or the operating-point static pressure P2 in FIG. 14.

Figure 18:
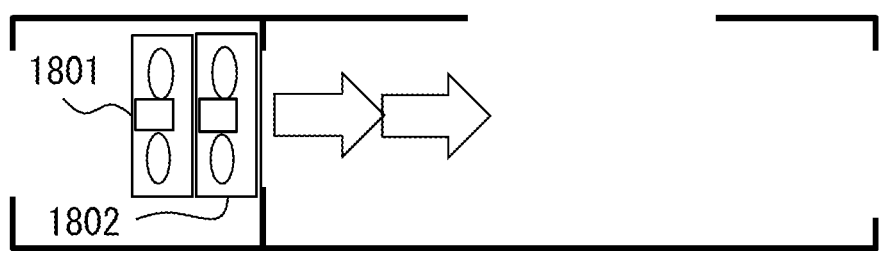
FIG. 18 is a diagram illustrating fans placed in series.

FIG. 18 illustrates an example of a simplified model in which two fans are placed in series. When a fan 1801 and a fan 1802 are placed in series, the aperture ratio of the simplified model is adjusted so that the sum of the operating-point static pressures of these fans becomes equal for the detailed model and the simplified model. The same applies to the case in which three or more fans are placed in series.

Next, an example of the acoustic analysis performed by the acoustic analysis unit 303 is explained with reference to FIG. 19A through FIG. 21. The acoustic analysis unit 303 generates an SEA model based on the simplified model 312 adjusted through the analysis model adjusting process and performs the acoustic analysis using the SEA model.

First, the acoustic analysis unit 303 generates an SEA model from the simplified model 312 using the method described in Patent document 2 or the like. The SEA model is generated by combining SEA elements, and shapes of the SEA elements are a cuboid or a shape in which a plurality of cuboids are combined. An SEA element generated at a position in the simplified model 312 at which a component model exists is provided with the name of the component model (component name) and attribute information (aperture ratio, material, thickness, and the like), and an SEA element generated in the space portion in which no component models exist is provided with a name such as SPACE or the like.

Figure 19B:
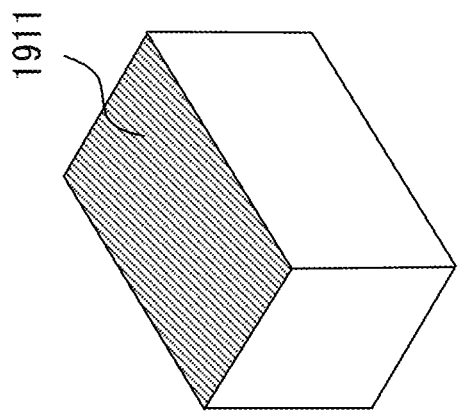
FIG. 19B is an illustration of a sound field element.
Figure 19A:
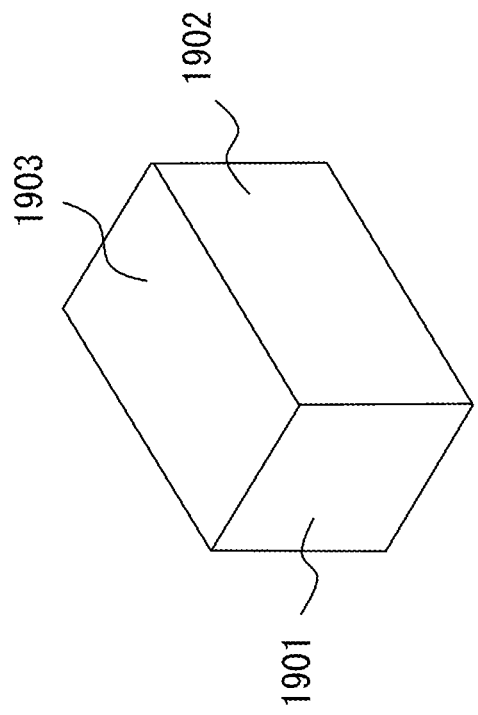
FIG. 19A is an illustration of plate elements.

FIG. 19A illustrates an example of plate elements that are types of SEA elements and FIG. 19B illustrates an example of a sound field element. Plate elements 1901 through 903 in FIG. 19A represent the plates that surround a cuboid space, and a sound field element 1911 in FIG. 19B represents the cuboid space surrounded by the plate elements 1901 through 1903.

Figure 20:
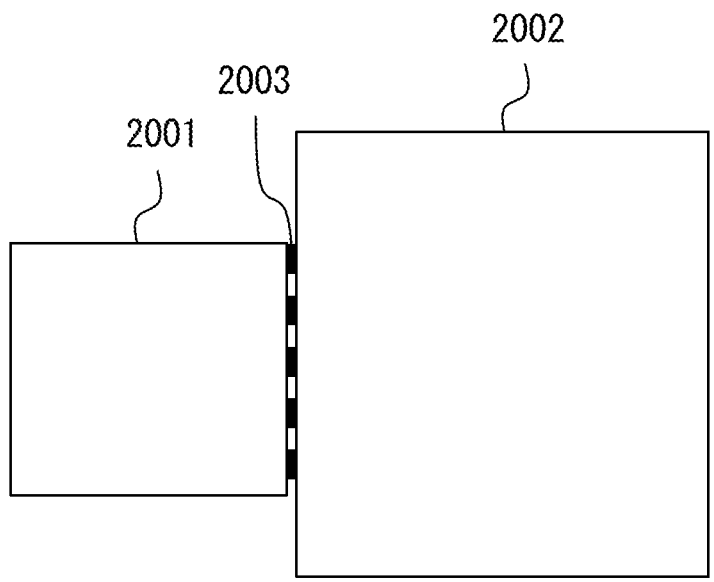
FIG. 20 is a diagram illustrating two sound field elements.

FIG. 20 illustrates an example of two adjacent sound field elements. A sound field element 2001 and a sound field element 2002 are adjacent across a plate element 2003 having a plurality of apertures. At this time, the coupling loss factor $\eta_{12}$ between the sound field element 2001 and the sound field element 2002 is given by the expressions below.

$$\eta_{12} = (c_V S_c / 4\omega V)\tau_{rp} \quad (1)$$

$$\tau_{rp} = \tau_{plate} + R\tau_{air} \quad (2)$$

The respective variables in the expression (1) and the expression (2) represent the following physical quantities.
$c_V$: Speed of sound [m/s]
$S_c$: Area of the plate element 2003 [m^2]
$\omega$: Angular frequency [rad/s]
$V$: Cubic volume of the sound field element 2001 [m^3]
$\tau_{rp}$: Average transmittance of the plate element 2003
$\tau_{plate}$: Transmittance of the plate element 2003
$\tau_{air}$: Transmittance of the atmosphere (1.0)
$R$: Aperture ratio for the plate element 2003

The aperture ratio of the component model that exists at the position in the simplified model 312 corresponding to the plate element 2003 is set as the aperture ratio R of the plate element 2003. Therefore, coupling loss factor $\eta_{12}$ may be calculated according to the expression (1) and the expression (2) using the aperture ratio of the simplified model 312.

As disclosed in Non-patent document 1 and Non-patent document 2, the acoustic power transmitted from a sound source to the outside of the apparatus may be obtained by sequentially calculating the coupling losses between the sound field elements according to the coupling loss factor 1112, based on the acoustic power of the sound source such as a fan or the like. Then, the acoustic analysis unit 303 calculates the coupling loss factor $\eta_{12}$ for each frequency according to the expression (1) and the expression (2), obtains the acoustic power that is transmitted to the outside of the apparatus for each frequency using the coupling loss factor $\eta_{12}$, and stores the obtained acoustic power in the storing unit 111 as the analysis result.

As described above, by using the aperture ratio of the simplified model 312 as the aperture ratio for the SEA model, it becomes possible to appropriately set the aperture ratio for an SEA model and the analysis accuracy in the acoustic analysis may be improved.

Figure 21:
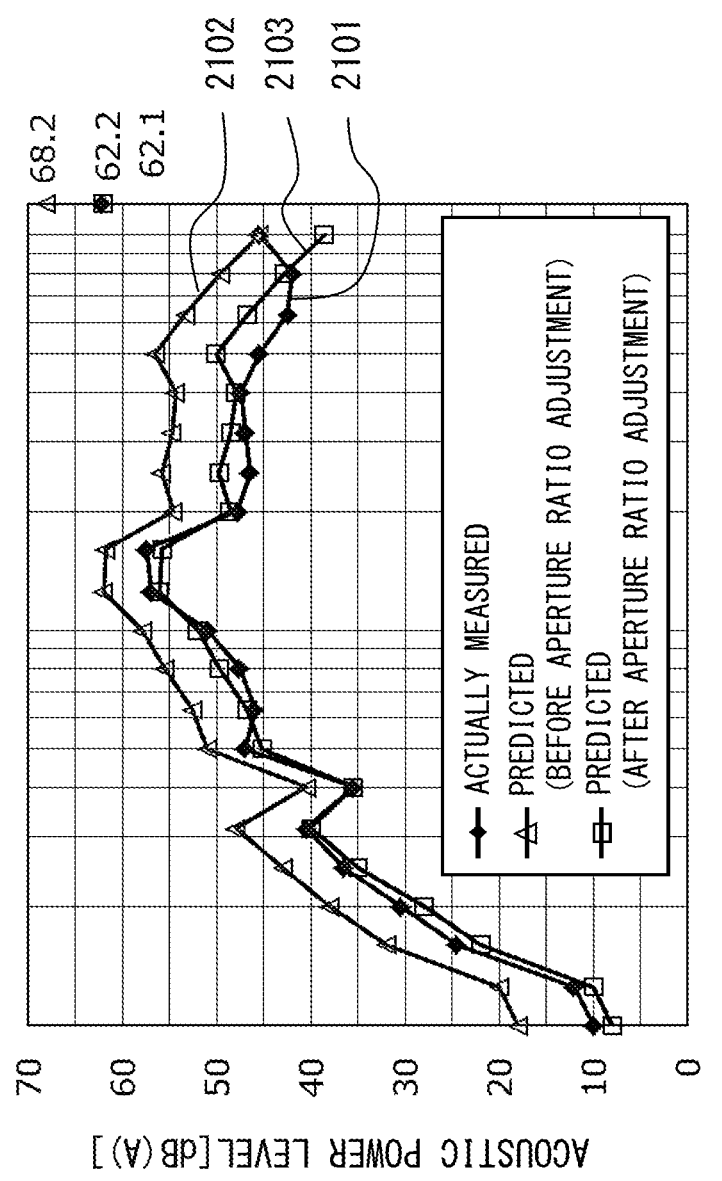
FIG. 21 is chart illustrating an analysis result of an acoustic analysis.

FIG. 21 presents an example of the analysis result of the acoustic analysis. The analysis result in FIG. 21 indicates the acoustic power level transmitted to the outside of the apparatus for each frequency. A polygonal line 2101 represents the actually measured value of the acoustic power level measured using an apparatus. A polygonal line 2102 represents a predicted value for the acoustic power level predicted using the aperture ratio of the simplified model 312 before adjustment, and the polygonal line 2103 represents the predicted value for the acoustic power level predicted using the adjusted aperture ratio of the simplified model 312. The polygonal line 2103 is closer to the polygonal line 2101 than the polygonal line 2102, and therefore, it is understood that the analysis accuracy is improved by the adjustment of the aperture ratio.

The configuration of the information processing apparatus 101 in FIG. 1 and FIG. 3 is merely an example, and the constituent elements may be partly omitted or changed according to the purpose or conditions of the information processing apparatus 101. For example, when another information processing apparatus is to execute the analysis processes, the fluid analysis unit 301, the thermal analysis unit 302, and the acoustic analysis unit 303 may be omitted. The information processing apparatus 101 may perform an analysis process other than the fluid analysis, the thermal analysis and the acoustic analysis using the simplified model 312.

The flowcharts in FIG. 2, FIG. 8, and FIG. 14 are merely an example, and the processes may be partly omitted or changed according to the configuration or conditions of the information processing apparatus 101. For example, in step 202 in FIG. 2, the changing unit 112 may indirectly change the aperture ratio by changing the aperture area, instead of directly changing the aperture ratio of the simplified model 312.

In addition, in step 805 and step 806 in FIG. 8, or in step 1405 and step 1406 in FIG. 14, the changing unit 112 may indirectly change the aperture ratio by changing the aperture area, instead of directly changing the aperture ratio of the simplified model 312.

The detailed model in FIG. 4A and FIG. 5, the simplified model in FIG. 4B, FIG. 6, FIG. 15, FIG. 17 and FIG. 18, the analysis model in FIG. 9, and the plate element in FIG. 19A and FIG. 20, and the sound field element in FIG. 19B and FIG. 20 are merely an example, and another model may be used according to the configuration or conditions of the information processing apparatus 101. In addition, the operating characteristics in FIG. 7 and FIG. 10, the air quantity in each of the apertures in FIG. 16, and the analysis result in FIG. 21 are merely an example, and other data may be used. The expression (1) and the expression (2) are merely an example, and the coupling loss factor may be calculated according to other calculation formulas.

FIG. 22 illustrates a hardware configuration example for the information processing apparatus 101 in FIG. 1 and FIG. 3. The information processing apparatus in FIG. 22 is equipped with a Central Processing Unit (CPU) 2201, a memory 2202, an input device 2203, an output device 2204, an auxiliary storage device 2205, a medium driving device 2206, and a network connection device 2207. These constituent elements are connected with each other by a bus 2208.

The memory 2202 is a semiconductor memory such as a Read Only Memory (ROM), a Random Access Memory (RAM), a flash memory or the like for example, and stores a program and data used for processing. The memory 2202 may be used as the storing unit 111 in FIG. 1 and FIG. 3.

The CPU 2201 (processor) operates as the changing unit 112, the fluid analysis unit 301, the thermal analysis unit 302, and the acoustic analysis unit 303 in FIG. 1 and FIG. 3 by executing the program using the memory 2202, for example.

The input device 2203 is a keyboard, a pointing device or the like, for example, which is used for inputting instructions and information from the operator or the user. The output device 2204 is a display device, a printer, a speaker or the like, which is used for outputting queries or instructions to the operator or the user, and the processing result. The processing result may be the adjusted simplified model 312, or it may be the analysis result of a fluid analysis, a thermal analysis or an acoustic analysis.

The auxiliary storage device 2205 is, for example, a magnetic disk apparatus, an optical disk apparatus, a magneto-optic disk apparatus, a tape apparatus or the like. The auxiliary storage apparatus 2205 may also be a hard disk drive or a flash memory. The information processing apparatus may store a program and data in the auxiliary storage device 2205 and may use them by loading them onto the memory 2202. The auxiliary storage device 2205 may be used as the storing unit 111 in FIG. 1 and FIG. 3.

The medium driving device 2206 drives a portable recording medium 2209 and accesses their recorded contents. the portable recording medium 2209 is a memory device, a flexible disk, an optical disk, a magneto-optic disk or the like. The portable recording medium 2209 may be a Compact Disk Read Only Memory (CD-ROM), a Digital Versatile Disk (DVD), a Universal Serial Bus (USB) memory or the like. The operator or the user may store a program and data in this portable recording medium 2209 and may use them by loading them onto the memory 2202.

Thus, the computer-readable recording medium that stores a program and data used for processing is a physical (non-transitory) recording medium such as the memory 2202, the auxiliary storage device 2205, or the portable recording medium 2209.

The network connection device 2207 is a communication interface that is connected to a communication network such as a Local Area Network, a Wide Area Network or the like and that performs data conversion involved in the communication.

The information processing apparatus may receive a program and data from an external apparatus via the network connection device 2207 and may use them by loading them onto the memory 2202.

The information processing apparatus may receive a processing request from a user terminal via the network connection device 2207, may execute the analysis model adjusting process, and may transmit the adjusted simplified model 312 to the user terminal.

Meanwhile, the information processing apparatus does not need to include all the constituent elements in FIG. 22, and the constituent elements may be partly omitted according to the purpose or conditions. For example, in the case in which the information processing apparatus receives the processing request from the user terminal via a communication network, the input device 2203 and the output device 2204 may be omitted. In addition, in the case in which the portable recording medium 2209 or a communication network is not to be used, the medium driving device 2206 or the network connection device 2207 may be omitted.

In the case in which the information processing apparatus is a portable terminal having a voice call function such as a smartphone, apparatuses for voice calls such as a microphone and a speaker may be included, and an imaging apparatus such as a camera may also be included.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein an analysis model adjustment program causing a computer to execute a process comprising:

comparing a first attribute value that indicates an operating point of a fan in a first analysis model that represents an apparatus that includes the fan with a second attribute value that indicates an operating point of the fan in a second analysis model that is more simplified than the first analysis model;

changing a plurality of aperture ratios for a plurality of apertures included in the second model according to a result of the comparing the first attribute value with the second attribute value and according to a difference between an air quantity at each of the plurality of apertures and an air quantity at each of a plurality of apertures included in the first analysis model corresponding to the plurality of apertures included in the second analysis model, each of the plurality of aperture ratios representing a ratio of an area of an aperture of a component model included by the second analysis model to a surface area of the component model;

generating a statistical energy analysis model based on the second analysis model, wherein the statistical energy analysis model is generated by combining a plurality of statistical energy analysis elements, a shape of each of the statistical energy analysis elements is a cuboid or a shape in which a plurality of cuboids are combined, a statistical energy analysis element generated at a position in the second analysis model at which the component model exists is provided with a name of the component model and of one of the plurality of aperture ratios changed according to the result of the comparing, and a statistical energy analysis element generated in a space portion in which no component models exist is provided with a name indicating a space;

performing an acoustic analysis process for the apparatus by using the statistical energy analysis model and obtaining acoustic power transmitted from the fan to outside of the apparatus; and outputting the acoustic power as an analysis result of the acoustic analysis process.

2. The non-transitory computer-readable recording medium according to claim 1, wherein the first attribute value is an air quantity that indicates the operating point of the fan in the first analysis model;

the second attribute value is an air quantity that indicates the operating point of the fan in the second analysis model; and the changing the plurality of aperture ratios of the second analysis model increases the plurality of aperture ratios of the second analysis model when the second attribute value is smaller than the first attribute value, and decreases the plurality of aperture ratios of the second analysis model when the second attribute value is larger than the first attribute value.

3. The non-transitory computer-readable recording medium according to claim 2, wherein the apparatus that includes the fan includes a first fan and a second fan that is placed in parallel to the first fan;

the first attribute value is a sum of an air quantity that indicates an operating point of the first fan in the first analysis model and an air quantity that indicates an operating point of the second fan in the first analysis model; and the second attribute value is a sum of an air quantity that indicates an operating point of the first fan in the second analysis model and an air quantity that indicates an operating point of the second fan in the second analysis model.

4. The non-transitory computer-readable recording medium according to claim 1, wherein the first attribute value is a static pressure that indicates the operating point of the fan in the first analysis model;

the second attribute value is a static pressure that indicates the operating point of the fan in the second analysis model; and the changing the plurality of aperture ratios of the second analysis model decreases the plurality of aperture ratios of the second analysis model when the second attribute value is smaller than the first attribute value, and increases the plurality of aperture ratios of the second analysis model when the second attribute value is larger than the first attribute value.

5. The non-transitory computer-readable recording medium according to claim 4, wherein the apparatus that includes the fan includes a first fan and a second fan that is placed in series with the first fan;

the first attribute value is a sum of a static pressure that indicates an operating point of the first fan in the first analysis model and a static pressure that indicates an operating point of the second fan in the first analysis model; and the second attribute value is a sum of a static pressure that indicates an operating point of the first fan in the second analysis model and a static pressure that indicates an operating point of the second fan in the second analysis model.

6. An information processing apparatus comprising:

a memory configured to store a first analysis model that represents an apparatus that includes a fan and a second analysis model that is more simplified than the first analysis model; and a processor configured to:

compare a first attribute value that indicates an operating point of the fan in the first analysis model with a second attribute value that indicates an operating point of the fan in the second analysis model;

change a plurality of aperture ratios for a plurality of apertures included in the second model according to a result of a comparison of the first attribute value with the second attribute value and according to a difference between an air quantity at each of the plurality of apertures and an air quantity at each of a plurality of apertures included in the first analysis model corresponding to the plurality of apertures included in the second analysis model, each of the plurality of aperture ratios representing a ratio of an area of an aperture of a component model included by the second analysis model to a surface area of the component model;

generate a statistical energy analysis model based on the second analysis model, wherein the statistical energy analysis model is generated by combining a plurality of statistical energy analysis elements, a shape of each of the statistical energy analysis elements is a cuboid or a shape in which a plurality of cuboids are combined, a statistical energy analysis element generated at a position in the second analysis model at which the component model exists is provided with a name of the component model and of one of the plurality of aperture ratios changed according to the result of the comparing, and a statistical energy analysis element generated in a space portion in which no component models exist is provided with a name indicating a space;

perform an acoustic analysis process for the apparatus that includes the fan by using the statistical energy analysis model and obtaining acoustic power transmitted from the fan to outside of the apparatus that includes the fan; and output the acoustic power as an analysis result of the acoustic analysis process.

7. The information processing apparatus according to claim 6, wherein the first attribute value is an air quantity that indicates the operating point of the fan in the first analysis model;

the second attribute value is an air quantity that indicates the operating point of the fan in the second analysis model; and the processor increases the plurality of aperture ratios of the second analysis model when the second attribute value is smaller than the first attribute value, and decreases the plurality of aperture ratios of the second analysis model when the second attribute value is larger than the first attribute value.

8. The information processing apparatus according to claim 6, wherein the first attribute value is a static pressure that indicates the operating point of the fan in the first analysis model;

the second attribute value is a static pressure that indicates the operating point of the fan in the second analysis model; and the processor decreases the plurality of aperture ratios of the second analysis model when the second attribute value is smaller than the first attribute value, and increases the plurality of aperture ratios of the second analysis model when the second attribute value is larger than the first attribute value.

9. A method of adjusting an analysis model comprising:

comparing by a processor a first attribute value that indicates an operating point of a fan in a first analysis model that represents an apparatus that includes the fan with a second attribute value that indicates an operating point of the fan in a second analysis model that is more simplified than the first analysis model;

changing by the processor a plurality of aperture ratios for a plurality of apertures included in the second model according to a result of the comparing the first attribute value with the second attribute value and according to a difference between an air quantity at each of the plurality of apertures and an air quantity at each of a plurality of apertures included in the first analysis model corresponding to the plurality of apertures included in the second analysis model, each of the plurality of aperture ratios representing a ratio of an area of an aperture of a component model included by the second analysis model to a surface area of the component model;

generating by the processor a statistical energy analysis model based on the second analysis model, wherein the statistical energy analysis model is generated by combining a plurality of statistical energy analysis elements, a shape of each of the statistical energy analysis elements is a cuboid or a shape in which a plurality of cuboids are combined, a statistical energy analysis element generated at a position in the second analysis model at which the component model exists is provided with a name of the component model and of one of the plurality of aperture ratios changed according to the result of the comparing, and a statistical energy analysis element generated in a space portion in which no component models exist is provided with a name indicating a space;

performing by the processor an acoustic analysis process for the apparatus by using the statistical energy analysis model and obtaining acoustic power transmitted from the fan to outside of the apparatus; and outputting by the processor the acoustic power as an analysis result of the acoustic analysis process.

10. The method according to claim 9, wherein
the first attribute value is an air quantity that indicates the operating point of the fan in the first analysis model;
the second attribute value is an air quantity that indicates the operating point of the fan in the second analysis model; and
the changing the plurality of aperture ratios of the second analysis model increases the plurality of aperture ratios of the second analysis model when the second attribute value is smaller than the first attribute value, and decreases the plurality of aperture ratios of the second analysis model when the second attribute value is larger than the first attribute value.

11. The method according to claim 9, wherein
the first attribute value is a static pressure that indicates the operating point of the fan in the first analysis model;
the second attribute value is a static pressure that indicates the operating point of the fan in the second analysis model; and
the changing the plurality of aperture ratios of the second analysis model decreases the plurality of aperture ratios of the second analysis model when the second attribute value is smaller than the first attribute value, and increases the plurality of aperture ratios of the second analysis model when the second attribute value is larger than the first attribute value.

* * * * *